United States Patent
Riach et al.

(10) Patent No.: US 8,447,035 B2
(45) Date of Patent: *May 21, 2013

(54) CONTRACT BASED MEMORY MANAGEMENT FOR ISOCHRONOUS STREAMS

(75) Inventors: Duncan A. Riach, East Sussex (GB); Brijesh Tripathi, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/440,380

(22) Filed: Apr. 5, 2012

(65) Prior Publication Data

US 2012/0188261 A1    Jul. 26, 2012

Related U.S. Application Data

(63) Continuation of application No. 11/678,733, filed on Feb. 26, 2007, now Pat. No. 8,155,316.

(60) Provisional application No. 60/862,090, filed on Oct. 19, 2006.

(51) Int. Cl.
*H04N 7/167* (2011.01)
*H04N 1/44* (2006.01)

(52) U.S. Cl.
USPC ........... 380/240; 380/241; 380/242; 380/243; 380/244; 380/245

(58) Field of Classification Search
USPC ........................................................ 380/240
See application file for complete search history.

(56) References Cited

U.S. PATENT DOCUMENTS

| | | | | |
|---|---|---|---|---|
| 5,818,433 | A * | 10/1998 | Sherburne | 345/540 |
| 6,690,377 | B2 * | 2/2004 | Tuomi | 345/519 |
| 6,897,871 | B1 | 5/2005 | Morein et al. | |
| 7,221,369 | B1 | 5/2007 | Tripathi et al. | |
| 7,415,575 | B1 * | 8/2008 | Tong et al. | 711/133 |
| 7,426,594 | B1 | 9/2008 | Riach et al. | |

* cited by examiner

*Primary Examiner* — Longbit Chai
(74) *Attorney, Agent, or Firm* — Kilpatrick Townsend & Stockton LLP

(57) ABSTRACT

A method of displaying an image includes generating a contract in the display engine, transferring the contract to the memory controller before the end of a sweep, generating a contract amendment in response to changes in the display engine, transferring the contract amendment to the memory controller, making a decision whether the contract amendment can be processed, fetching data from the memory controller according to the contract incorporating the contract amendment if the decision is that the contract amendment can be processed, sending the fetched data to the display engine in an isochronous stream; and processing the fetched data using the display engine.

20 Claims, 9 Drawing Sheets

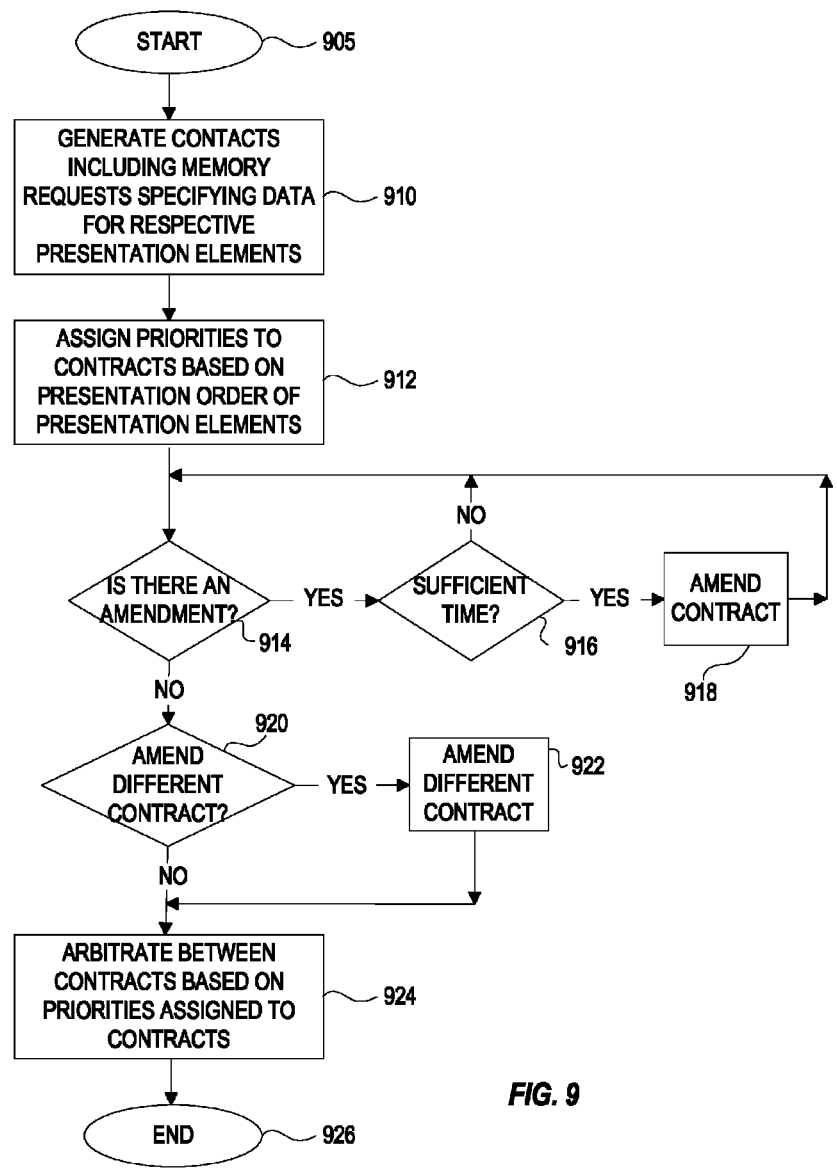

CONTRACT BASED MEMORY MANAGEMENT FOR ISOCHRONOUS STREAMS

CROSS-REFERENCE TO RELATED APPLICATIONS

This application is a continuation of U.S. patent application Ser. No. 11/678,733. filed Feb. 26, 2007, which claims the benefit of U.S. Provisional Appln. No. 60/862,090, filed Oct. 19, 2006. The disclosures of both applications are incorporated herein by reference in their entirety for all purposes.

BACKGROUND OF THE INVENTION

In current graphics processing systems, the number and processing speed of memory clients have increased enough to make memory access latency a barrier to achieving high performance. In some instances, various memory clients share a common memory, and each memory client issues requests for data stored in the common memory based on individual memory access requirements. Requests from these memory clients are typically serialized through a common interface. As a result, requests are sometimes queued up for servicing prior to a critical request, where "critical request" refers to a request that should be serviced promptly to prevent underflow of an output data stream or overflow of an input data stream, in which underflow or overflow can sometimes lead to screen corruption or other errors. In some instances, a non-critical request subsequently becomes critical but is queued up for servicing behind non-critical requests. However, a critical request issued behind non-critical requests may have to wait for all prior non-critical requests to be serviced first, thus leading to increased service time for the critical request and potential screen corruption.

FIG. 1 illustrates a computer system that retrieves data in response to individual requests for data that are sent by the display engine to the memory controller, where the individual requests are queued up until the individual requests can be processed. FIG. 1 includes a graphics controller 110, which includes a memory controller 112 and a display engine 114 with a display buffer 116, a DRAM 118, and a monitor 120. The display engine 114 determines when more data is needed and sends individual requests to the memory controller 112 requesting that the memory controller 112 retrieve the specific data from the DRAM 118. The individual requests include the address, width and size of each array of data being requested. The memory controller 112 then processes the queued individual requests in order and retrieves the requested data from the DRAM 118. The retrieved data is sent back to the display engine 114 where it is stored in the display buffer 116 until it is needed by the display engine 114. The display engine 114 then processes the retrieved data and displays that data on the monitor 120.

Since the individual requests from the display engine 114 only include specific information about the data being retrieved such as address, size and width of the data, the memory controller 112 must have additional information about the memory it is accessing in order to effectively access the requested data. Additionally, the display buffer 116 must be big enough to store all of the data being requested by the display engine 114. Since the memory controller 112 simply processes individual requests as they are queued up, the display buffer 116 must be sufficiently large to store sufficient data in the event that changes occur and the display engine 114 cannot process the retrieved data as fast as it receives the data. Conversely, there may be delays in retrieving data, and display engine 114 must buffer enough data in display buffer 116 that it does not run out of data while waiting for data to be retrieved.

For example, when the display engine 114 sends an individual request for retrieving specific data to the memory controller 112, the memory controller 112 queues the individual requests, processes the requests sequentially and retrieves the specific requested data sequentially. Once the memory controller 112 queues the request, the request will not be processed until its turn arrives regardless of the criticality of the request. The retrieved data is then sequentially transmitted back to the display engine 114, regardless of whether the display engine 114 is ready to process the data or not. The display engine 114 must have a sufficiently large display buffer 116 to store all of this requested data because the display engine 114 may not be ready to process the data as fast as it receives the data. There are many reasons why the display buffer 116 may not be able to process data as fast as it receives the data including changed conditions, which could require processing data in a different order than the data was received. In such a situation the earlier requested data would have to be stored until the later requested data can be processed. This has a disadvantage of requiring a larger display buffer 116 and more processing power to process this data in a different order than the data was received.

Therefore what is needed is a system and method for controlling the retrieval of data from memory that can accommodate changes in data requests without having to store large amounts of data in display buffers.

BRIEF SUMMARY OF THE INVENTION

According to embodiments of the invention, methods are provided that retrieve data according to contracts having sets of instructions. A process engine, such as a display engine retrieves data from memory by sending contracts, or sets of instructions, to the memory controller. The memory controller then retrieves data from the memory according to the set of instructions and transmits that data to the display engine for the display engine to process and display. Moreover, isochronous memory clients in the display engines can set up a single contract for large blocks of data (e.g. for an entire frame) with the memory controller, which can pre-fetch data, thus reducing the number of critical memory requests.

In one embodiment of the present invention, a method of retrieving data stored in a memory includes generating a contract in a process engine, where the contract includes instructions for multiple memory fetches, transferring the contract from the process engine to a memory controller, performing a plurality of memory access operations to fetch data from the memory according to the contract, sending the fetched data to the process engine according to the contract, and processing the fetched data using the process engine to generate pixels of an image for display. The process engine can be a display engine.

In another embodiment of the present invention, generating the contract includes generating a set of instructions for retrieving data from the memory.

In yet another embodiment of the present invention, generating a set of instructions for retrieving data comprises generating a set of instructions for each surface. The set of instructions for each surface can be generated by providing a base address for data corresponding to each surface, providing a starting offset for retrieving a portion of the data corresponding to each surface, providing a width and height of the surface from which to retrieve data, providing a relative scan-out positioning, and providing scaling.

In yet another embodiment of the present invention, generating a contract includes specifying in the contract a pixel rate for each head.

In yet another embodiment of the present invention, the fetched data is sent to the display engine in an isochronous stream.

In yet another embodiment of the present invention, generating a set of instructions for retrieving data comprises providing information as to an isochronous bandwidth. In one embodiment the isochronous bandwidth is greater than 8 GB/s.

In yet another embodiment of the present invention, the fetched data is buffered in the display engine.

In yet another embodiment of the present invention, retrieving data stored includes generating a second contract in a second process engine, where the second contract includes instructions for multiple memory fetches, transferring the second contract from the second process engine to a memory controller, performing a plurality of memory access operations to fetch a second data from the memory according to the second contract, sending the fetched second data to the second process engine according to the second contract, and processing the fetched second data using the second process engine to generate pixels of an image for display. The second contract can be transferred after the first contract is transferred and after one sweep is performed.

In yet another embodiment of the present invention, retrieving data stored includes generating a contract amendment in response to a change in the display engine, transferring the contract amendment to the memory controller, determining whether the contract amendment is processible, and fetching data from memory controller according to the contract incorporating the contract amendment in the event that the contract amendment can be processed. The decision can be based on whether the memory controller has sufficient time to incorporate the contract amendment.

In yet another embodiment of the present invention, a method of retrieving data stored in a memory includes generating a first contract in a display engine, where the first contract includes instructions for multiple memory fetches, transferring the first contract from the display engine to a memory controller, performing a plurality of memory access operations to fetch a first data from the memory according to the first contract, sending the fetched first data to the display engine according to the first contract, processing the fetched first data using the display engine to generate pixels of an image for display, generating a second contract in the display engine, where the second contract includes instructions for multiple memory fetches, transferring the second contract from the display engine to a memory controller, performing a plurality of memory access operations to fetch a second data from the memory according to the second contract, sending the fetched second data to the display engine according to the second contract, and processing the fetched second data using the display engine to generate pixels of an image for display.

In yet another embodiment of the present invention, retrieving data stored includes generating a contract amendment in response to changes in the display engine, transferring the contract amendment to the memory controller, making a decision whether the contract amendment can be processed along with the first contract, and fetching data from the memory controller according to the first contract incorporating the contract amendment if the decision is that the contract amendment can be processed along with the first contract. The decision can be based on whether the memory controller has sufficient time to incorporate the contract amendment into the first contract.

In yet another embodiment of the present invention, retrieving data stored includes, in the event that the contract amendment cannot be processed with the first contract, incorporating the contract amendment into the second contract, and fetching data according to the second contract as amended. The first data and the second data can be sent to the display engine in an isochronous stream.

In yet another embodiment of the present invention, a system for retrieving data stored in a memory includes a process engine configured to generate a contract, the contract comprising instructions for multiple memory fetches, a memory controller coupled to the process engine, wherein the memory controller is configured to receive the contract from the process engine, wherein the memory controller is configured to process the contract by performing a plurality of memory access operations to fetch data from the memory according to the contract, wherein the memory controller is configured to send the fetched data to the process engine according to the contract, and wherein the process engine is configured to process the fetched data to generate pixels of an image for display. The process engine can be a display engine.

In yet another embodiment of the present invention, the process engine is further configured to generate an amendment to the contract.

In another embodiment of the present invention, a processing apparatus for displaying an image includes a memory request generator configured to generate contracts specifying data ranges for respective presentation elements. The memory request generator is configured to assign priorities to the contracts based on a presentation order of the presentation elements. The processing apparatus also includes a memory request arbiter connected to the memory request generator. The memory request arbiter is configured to issue the contracts based on the priorities assigned to the contracts.

In yet another embodiment, the processing apparatus includes a memory request arbiter configured to receive a first contract specifying data for a first presentation element and a second contract specifying data for a second presentation element. The memory request arbiter is configured to arbitrate between the first contract and the second contract based on a presentation order of the first presentation element and the second presentation element.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

FIG. 9 illustrates a flow chart for servicing contracts along with amendments in accordance with another embodiment of the invention.

DETAILED DESCRIPTION OF THE INVENTION

Embodiments of the present invention use contracts to retrieve ranges of data stored in memory. Contracts used to request ranges of data include sets of instructions which instruct the memory controller what data to retrieve and in some cases how to retrieve that data, as is further described with reference to the figures below. Additionally, amendments can be used to amend or modify contracts after the contracts have been sent to the memory controller. As will be discussed in more detail below, isochronous memory clients (e.g. in a display engine of a graphics processor) can set up a contract for an entire frame of data with the memory controller, which can pre-fetch data. This ability to pre-fetch data based on information in a contract reduces the number of critical memory requests sent by the display engine to the memory controller. Sending a contract for the entire frame also improves the fetching order of data across different isochronous streams that are composed on the same frame. Additionally, by using a contract that predetermines the fetch order, the amount of buffering space required within the isochronous engine can be reduced. It should also be noted that by using contracts to retrieve data, instead of individual requests, data can be retrieved more intelligently than by sequentially processing individual data requests that have been queued up in the memory controller. For example, a contract can be amended to shift processes such as scaling pixels, manipulating pixels and combining pixels from the display engine to the memory controller, whereas individual data requests are simply executed by the memory controller and data is transmitted to the display buffer for processing.

Figure 1:
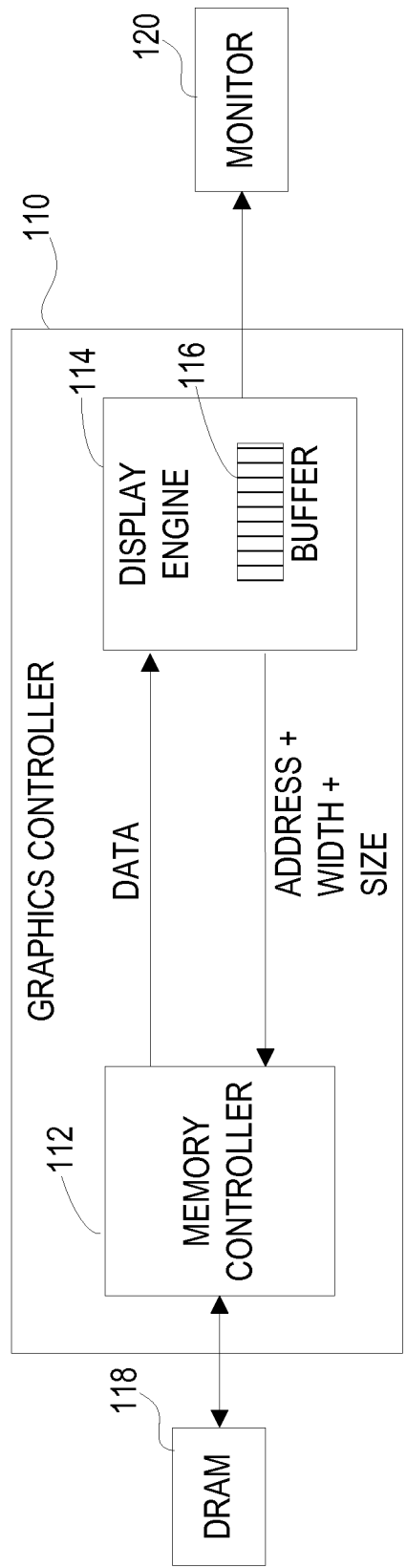
FIG. 1 illustrates a prior art computer system with the display engine requesting data from the memory controller.
Figure 2:
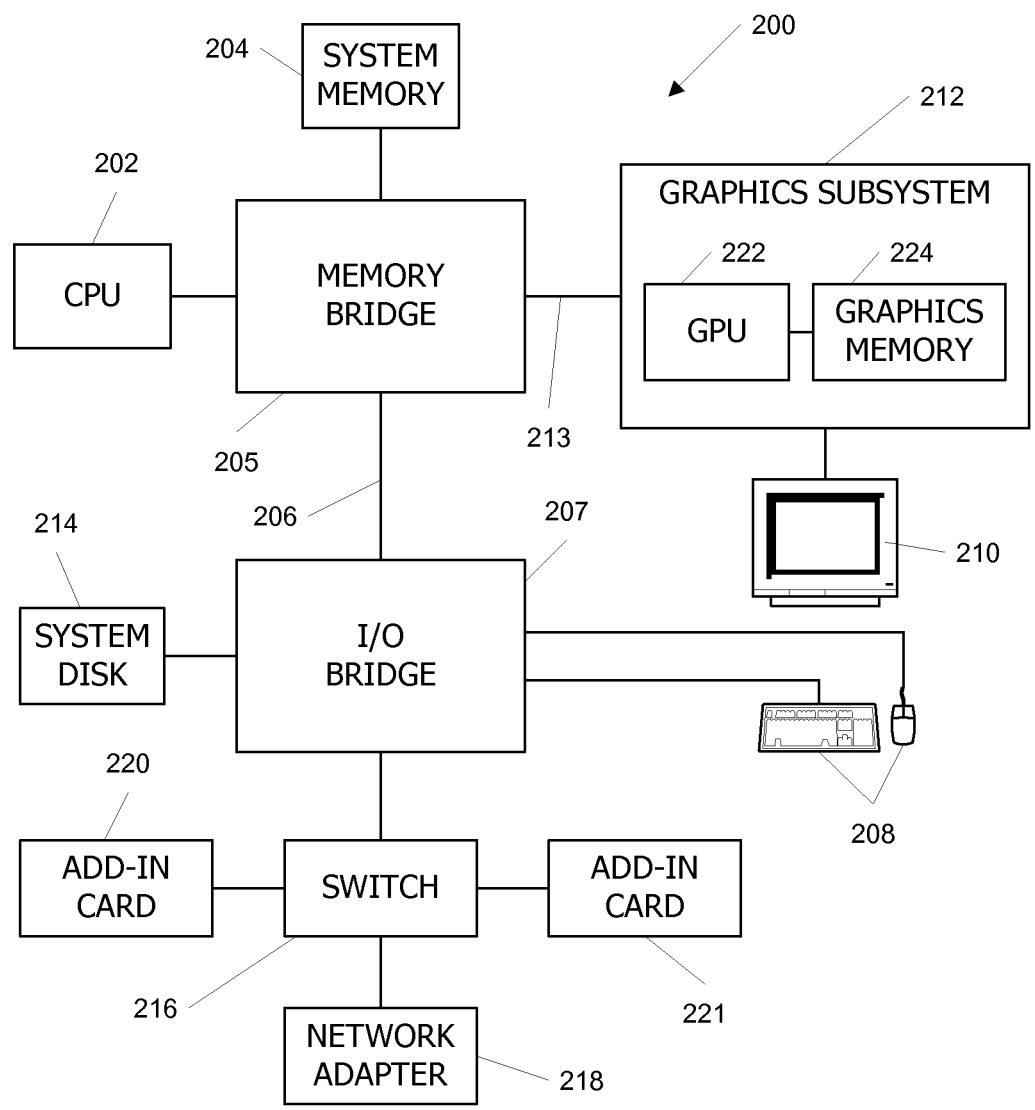
FIG. 2 illustrates a computer system that can be operated in accordance with an embodiment of the invention.

FIG. 2 is a block diagram of a computer system 200 according to an embodiment of the present invention. Computer system 200 includes a central processing unit (CPU) 202 and a system memory 204 communicating via a bus path that includes a memory bridge 205. Memory bridge 205, which may be, e.g., a conventional Northbridge chip, is connected via a bus or other communication path 206 (e.g., a HyperTransport link) to an I/O (input/output) bridge 207. I/O bridge 207, which may be, e.g., a conventional Southbridge chip, receives user input from one or more user input devices 208 (e.g., keyboard, mouse) and forwards the input to CPU 202 via bus 206 and memory bridge 205. Display output is provided on a pixel based display device 210 (e.g., a conventional CRT or LCD based monitor) operating under control of a graphics subsystem 212 coupled to memory bridge 205 via a bus or other communication path 213, e.g., a PCI Express (PCI-E) or Accelerated Graphics Port (AGP) link. A system disk 214 is also connected to I/O bridge 207. A switch 216 provides connections between I/O bridge 207 and other components such as a network adapter 218 and various add-in cards 220, 221. Other components (not explicitly shown), including USB or other port connections, CD drives, DVD drives, and the like, may also be connected to I/O bridge 207. Bus connections among the various components may be implemented using bus protocols such as PCI (Peripheral Component Interconnect), PCI-E, AGP, HyperTransport, or any other bus or point-to-point communication protocol(s), and connections between different devices may use different protocols as is known in the art.

Graphics processing subsystem 212 includes a graphics processing unit (GPU) 222 and a graphics memory 224, which may be implemented, e.g., using one or more integrated circuit devices such as programmable processors, application specific integrated circuits (ASICs), and memory devices. GPU 222 may be configured to perform various tasks related to generating pixel data from graphics data supplied by CPU 202 and/or system memory 204 via memory bridge 205 and bus 213, interacting with graphics memory 224 to store and update pixel data, and the like. For example, GPU 222 may generate pixel data from 2-D or 3-D scene data provided by various programs executing on CPU 202. GPU 222 may also store pixel data received via memory bridge 205 to graphics memory 224 with or without further processing. GPU 222 also includes a display engine configured to deliver pixel data from graphics memory 224 to display device 210. The display engine is an isochronous processing engine that obtains pixel data from graphics memory 204 using contracts, as described below.

CPU 202 operates as the master processor of system 200, controlling and coordinating operations of other system components. In particular, CPU 202 issues commands that control the operation of GPU 222. In some embodiments, CPU 202 writes a stream of commands for GPU 222 to a command buffer, which may be in system memory 204, graphics memory 224, or another storage location accessible to both CPU 202 and GPU 222. GPU 222 reads the command stream from the command buffer and executes commands asynchronously with operation of CPU 202. The commands may include conventional rendering commands for generating images as well as general-purpose computation commands that enable applications executing on CPU 202 to leverage the computational power of GPU 222 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 204 is connected to CPU 202 directly rather than through a bridge, and other devices communicate with system memory 204 via memory bridge 205 and CPU 202. In other alternative topologies, graphics subsystem 212 is connected to I/O bridge 207 rather than to memory bridge 205. In still other embodiments, I/O bridge 207 and memory bridge 205 might be integrated into a single chip. The particular components shown herein are optional; for instance, any number of add-in cards or peripheral devices might be supported. In some embodiments, switch 216 is eliminated, and network adapter 218 and add-in cards 220, 221 connect directly to I/O bridge 207.

The connection of GPU 222 to the rest of system 200 may also be varied. In some embodiments, graphics system 212 is implemented as an add-in card that can be inserted into an expansion slot of system 200. In other embodiments, a GPU is integrated on a single chip with a bus bridge, such as memory bridge 205 or I/O bridge 207.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 213. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, hand-held devices such as mobile phones or personal digital assistants, and so on.

Figure 3:
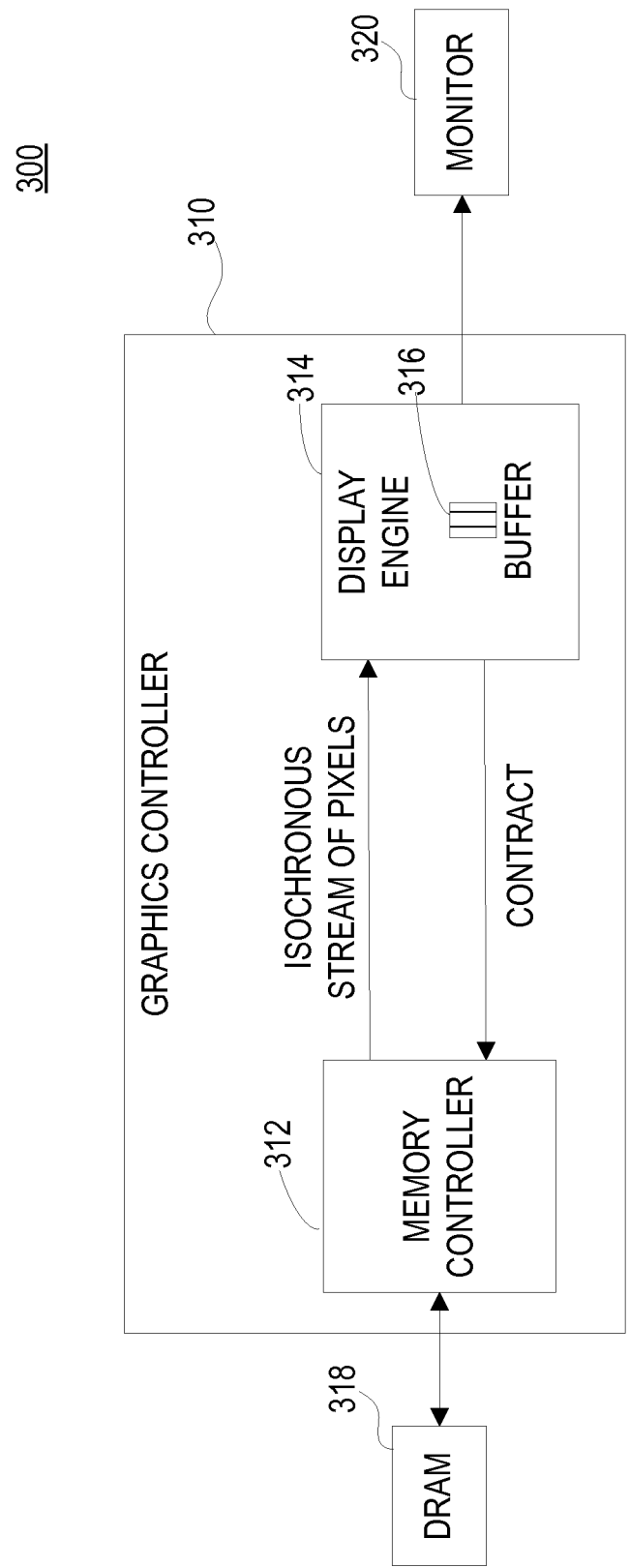
FIG. 3 illustrates a high level view of a computer system with the display engine requesting data from the memory controller using contracts, in accordance with an embodiment of the invention.

FIG. 3 is a high level block diagram showing a computer system 300 in which a display engine requests data from the memory controller using contracts, in accordance with an embodiment of the invention. Computer system 300 includes a graphics controller 310, which includes a memory controller 312 and a display engine 314 with a display buffer 316, a DRAM 318, and a monitor 320. The display engine 314 determines when more data is needed and sends a contract to the memory controller 312 requesting that the memory controller 312 retrieve a range of data from the DRAM 318. The contract can include a set of instructions which is used by the memory controller to retrieve a range of data from memory, as is described below with reference to FIG. 4. The memory controller 312 processes the queued contracts in order and retrieves the requested data from the DRAM 318. Not only can the contract instruct the memory controller what data to retrieve, the contract can also provide instructions about manipulating the retrieved data, transmitting the retrieved data, etc, as will be described below with reference to FIG. 4. The retrieved data is sent back to the display engine 314 as an isochronous stream of pixels where it is stored in the display buffer 316 until it is needed by the display engine 314. The display engine 314 then processes the retrieved data and displays that data on the monitor 320. In this embodiment of the invention, the display buffer 316 can be small compared to the conventional display buffer 116 because the contract allows for better management of data retrieval. Since data can be retrieved when needed, there is no requirement to have a large display buffer to store a large amount of data that is not needed immediately.

Figure 4:
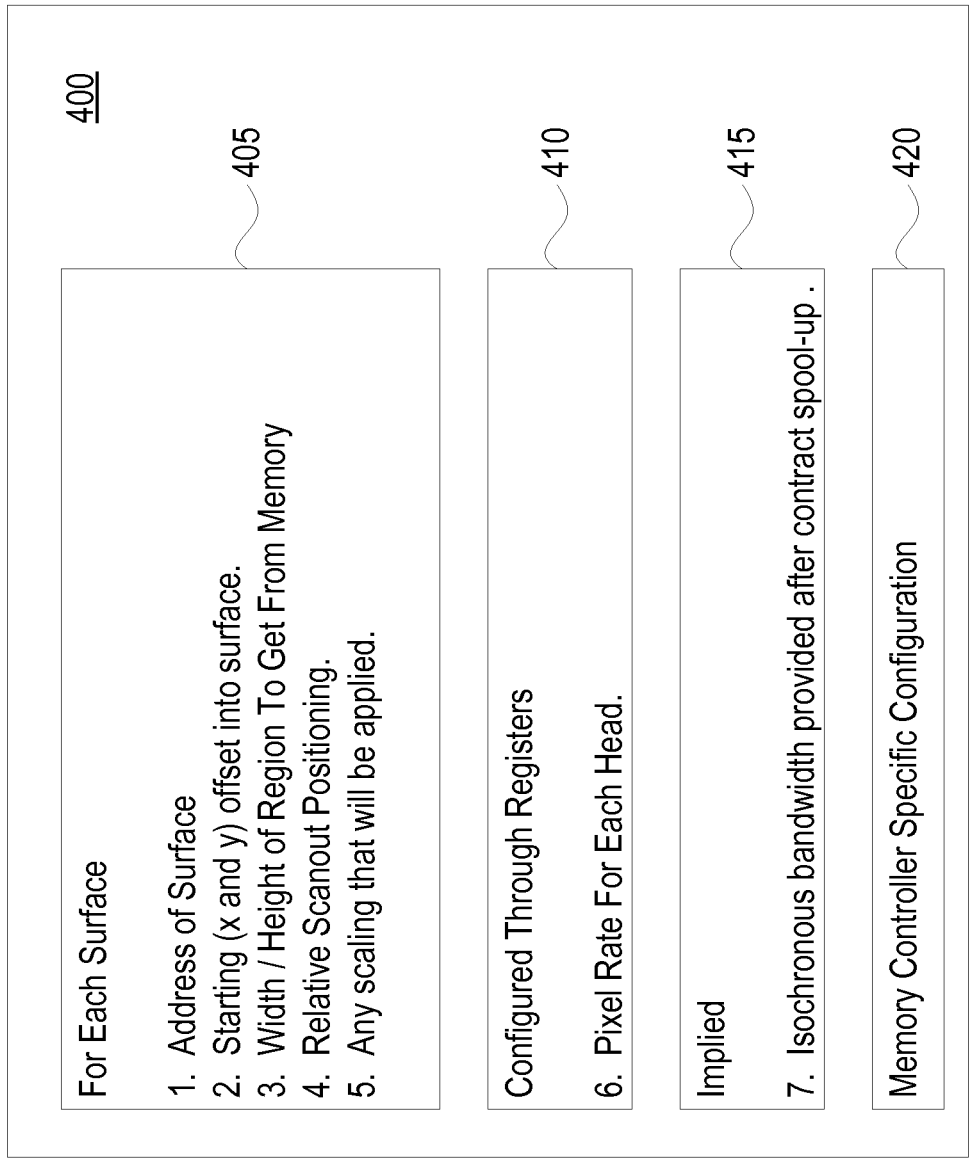
FIG. 4 is a block diagram illustrating the components of a contract in accordance with one embodiment of the invention.

FIG. 4 is an illustration of a contract 400 used to make memory request in accordance with one embodiment of the invention. Contract 400 can be used to request data for an entire surface, e.g. the entire frame or a portion thereof, such as overlay. Contract 400 includes a first set of instructions 405 describing the surface, a second set of instructions 410 which are configured through the registers, an implied set of instructions 415, and a memory controller specific configuration 420. The first set of instruction 405 provided for each surface includes (1) the address of the surface, (2) the starting point in screen coordinates (X,Y) of the surface for which data is needed, (3) the width and height of the region within the surface to get memory from, (4) relative scan-out positioning (i.e. where on the screen the data will appear), and (5) the scaling, if any, that will be applied. In one embodiment, the scaling will be applied to only the overlay and is used to keep the fetch rate and the scan-out rate substantially the same. The second set of instructions 410 which is configured through the register includes a (6) a pixel rate for each head. The pixel rate is a configurable parameter specific to a particular display head: for instance, a VGA compatible display head and an HDMI compatible display head will have different pixel rates. The implied set of instructions 415 includes isochronous bandwidth provided after contract spool up. The memory controller specific configuration 420 includes information that is specific to memory controllers.

The contract 400 is generated and sent out soon thereafter, if not immediately. The delay time between when a contract is generated and when it is sent out can be, for example, several clock cycles or as low as one clock cycle. In one embodiment, the time between when contracts are sent out can range between several times per sweep to once every several sweeps. For example, in one embodiment the contract is sent out once every sweep, (i.e. once for each scan across the entire screen). If the sweep rate is between 60 Hz and 90 Hz, then the contract would be sent out about once every 0.011 seconds to about once every 0.017 seconds. Moreover the contract can be sent out prior to the scan reaching the end of the last scan line. For example, a contract might be sent out five or six lines before the last portion of data is sent back from the memory. In another embodiment, if the contract is sent out at the frame rate of 30 Hz, then a contract would be sent out about once every 0.033 seconds. In one embodiment, operation of the display engine begins by first sending a contract and then starting the raster scan of the display device. Since the exact time or point within the sweep at which the contract is sent out can be programmable, those skilled in the art will realize that this time or point can be varied.

In another embodiment, a warning signal indicating that a contract will be sent is transmitted prior to sending a contract. An advantage of sending a warning signal indicating that a contract is imminent is that the system can adjust for this contract. In one embodiment, the warning is done by setting a bit. Warning signals can be used in VGA mode, which can include a split screen mode. In VGA mode, data can be scanned out from two different buffers for two halves of a screen. For example, when the warning signal, which can be interpreted to wait for an amendment, is set in the contract, the isohub does not start on the contract until it gets the amendment which is meant for a specified line on the screen. Once the amendment is received, the isohub fetches data from the first buffer for the top of the screen and then next buffer for the bottom screen.

Figure 5:
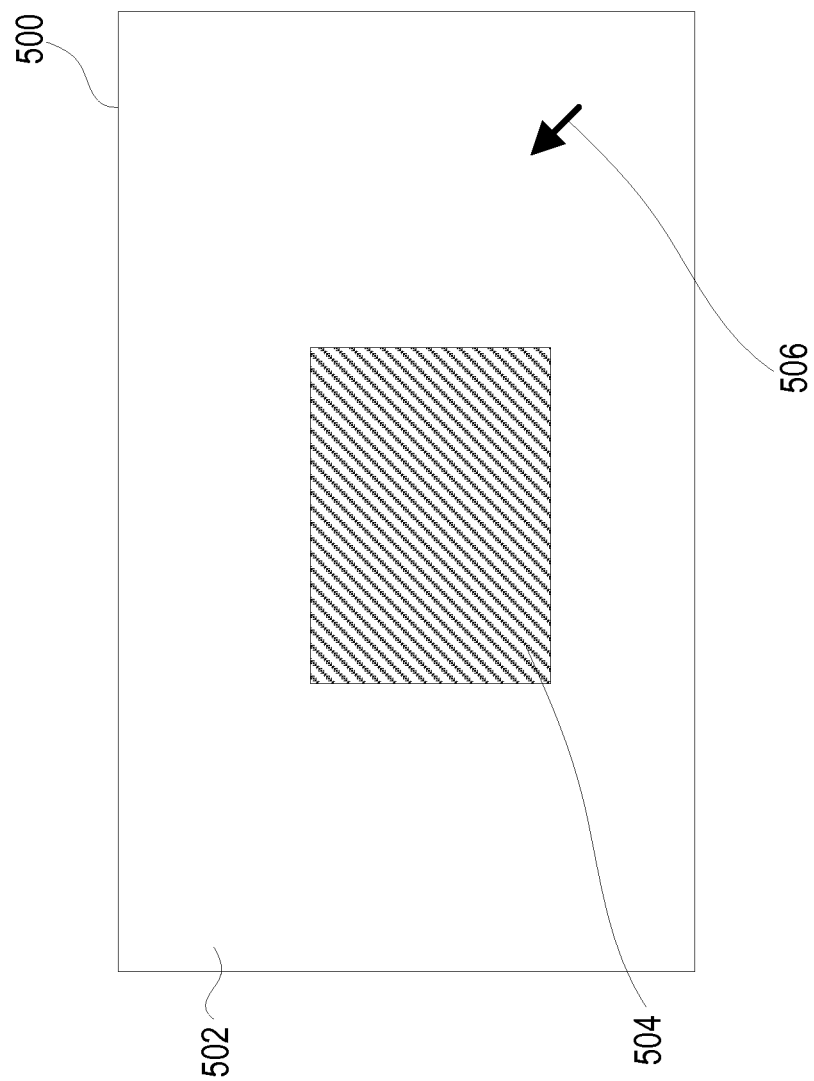
FIG. 5 illustrates a multi-part composite image generated from multiple client requests, in accordance with one embodiment of the invention.

In some embodiments, contracts are used to coordinate requests from multiple memory clients within the display engine. Multiple clients might be used to generate composite images on the fly. FIG. 5 illustrates a multi-part composite image generated from multiple client requests having a base or background 502, an overlay 504 and a cursor 506. The base or background 502 can correspond to, for example, a background image, while the overlay 504 can correspond to, for example, a window containing a foreground image. When generating the display, a first memory client processes data to generate the base or background 502, a second memory client processes data to generate the overlay 504, and a third memory client processes data to generate the cursor 506. In one embodiment of the invention, a memory request generator creates a contract in response to receiving a request from the first memory client to retrieve data for base or background 502, a request from the second memory client to retrieve data for an overlay 504, and request from the third memory client to retrieve data for the cursor 506. The contract generated by the memory request generator includes instructions for retrieving data corresponding to the base 502, the overlay 504 and the cursor 506. Therefore, a contract generated by the memory request generator in response to requests from the first, second and third memory clients is used to compose, on the fly, the image depicted in FIG. 5, which includes the base or background 502, the overlay 504, and the cursor 506. The data for the base or background 502, the overlay 504, and the cursor 506 may be stored in different buffers and the contract retrieves the corresponding data from the different buffers and relays that retrieved data to the appropriate memory client.

Figure 6:
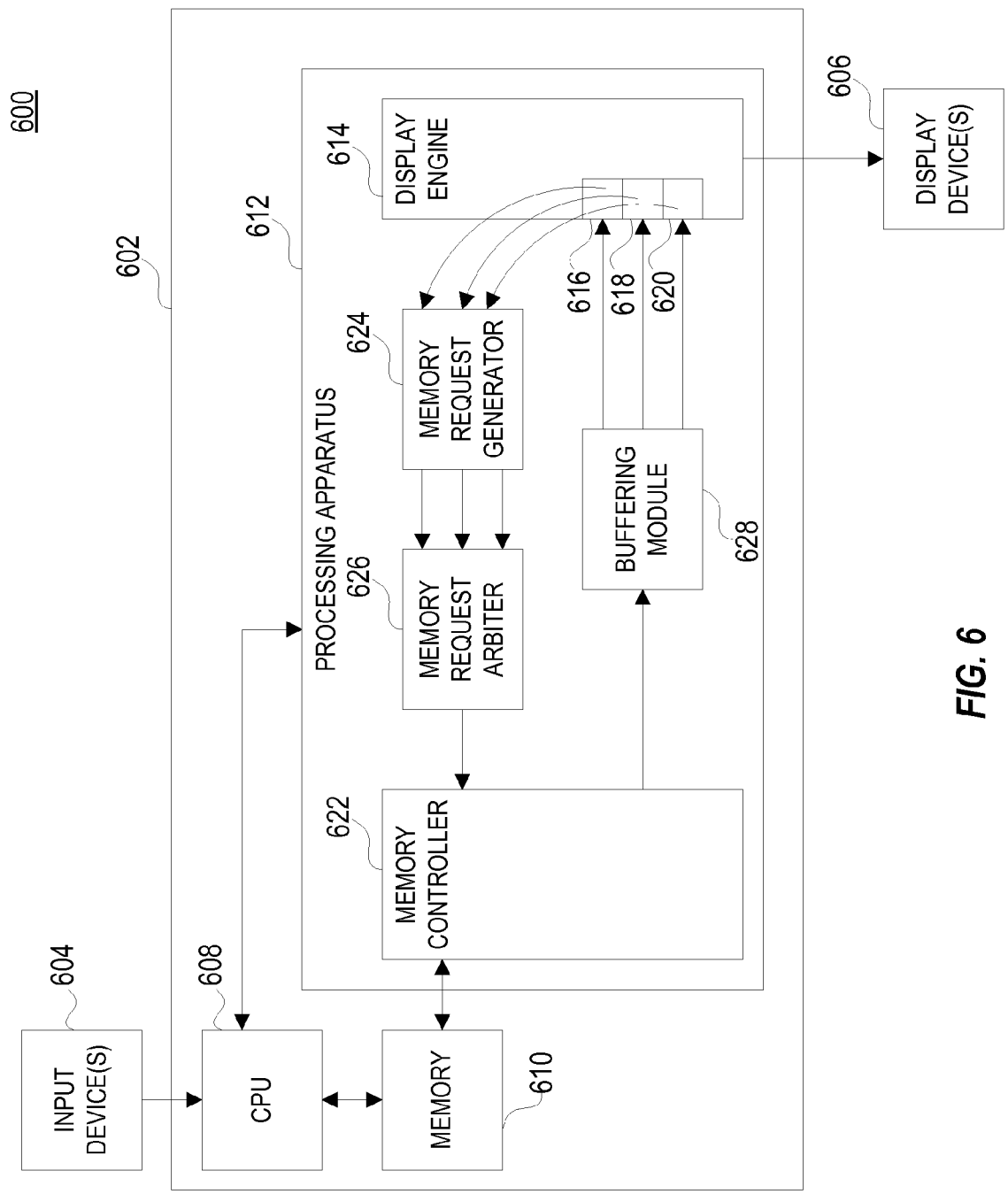
FIG. 6 illustrates a detailed viewed of another computer system that can be operated in accordance with an embodiment of the invention.

FIG. 6 is a block diagram illustrating a computer system that uses contracts to coordinate requests from multiple memory clients within the display engine to display composite images on the fly as shown in FIG. 5, in accordance with an embodiment of the invention. The computer system 600 includes a computer 602, which can correspond to, for example, a personal computer, a workstation, a set-top box, a portable computing device, a game console, or any other device with digital signal processing capability. As illustrated in FIG. 6, the computer 602 is connected to a set of input devices 604, which can include, for example, a keyboard and a mouse. The computer 602 is also connected to a set of display devices 606, which can include, for example, a television set, a Cathode Ray Tube monitor, or a Liquid Crystal Display monitor.

The computer 602 includes a Central Processing Unit ("CPU") 608, which is connected to a memory 610. The memory 610 can include, for example, a Random Access Memory ("RAM") and/or a Read Only Memory ("ROM"). As illustrated in FIG. 6, the computer 602 also includes a processing apparatus 612 that is connected to the CPU 608 and the memory 610. The processing apparatus 612 can correspond to a graphics processing apparatus, such as, for example, a Graphics Processing Unit ("GPU"). In one embodiment, the processing apparatus 612 performs a number of processing operations to generate display outputs using the set of display devices 606. Alternatively, or in conjunction, the processing apparatus 612 may perform a number of processing operations to generate streaming outputs to be delivered to the set of display devices 606.

In the illustrated embodiment, the processing apparatus 612 includes a display engine 614, which includes memory clients 616, 618, and 620. While three memory clients are illustrated in FIG. 6, it will be appreciated that more or fewer memory clients can be included, depending on the particular implementation. In the illustrated embodiment, the memory clients 616, 618, and 620 process data to generate respective components of a composite image using the set of display devices 606. For example, the memory client 616 can process data to generate a base, the memory client 618 can process data to generate an overlay, and the memory client 620 can process data to generate a cursor. The memory clients 616, 618, and 620 can generate respective components of a composite image for the same display device or for different display devices included in the set of display devices 606. At least one of the memory clients 616, 618, and 620 corresponds to an isochronous memory client, which is a client that expects data to be delivered in a substantially periodic manner or in accordance with a baseline rate. As can be appreciated, untimely delivery of data to an isochronous memory client can lead to a stall and degradation of a display or an audio output. In an alternative embodiment, at least one of the memory clients 616, 618, and 620 can correspond to an audio processing module that processes data to generate an audio element. The audio elements are delivered isochronously to an audio output device (e.g. a speaker) to produce a continuous soundtrack that might be synchronized with the video display.

In the illustrated embodiment, the processing apparatus 612 also includes a memory controller 622, which is connected to the display engine 614 via a memory request generator 624 and a memory request arbiter 626. The memory controller 622 serves as an interface between the memory clients 616, 618, and 620 and the memory 610. In the illustrated embodiment, the memory request generator 624 creates contracts in response to the memory clients 616, 618, 620. The memory request arbiter 626 then issues contracts for the memory request generator 624. In response to these contracts, the memory controller 622 retrieves data from the memory 610 for the memory clients 616, 618, and 620. The operation of the memory request generator 624 and the memory request arbiter 626 is further described below.

As illustrated in FIG. 6, the processing apparatus 612 also includes a buffering module 628, which is connected between the memory controller 622 and the display engine 614. The buffering module 628 temporarily stores data retrieved by the memory controller 622 and delivers the data to the memory clients 616, 618, and 620. The buffering module 628 can serve to cover for or reduce memory access latency by storing an advance supply of data to be delivered to the memory clients 616, 618, and 620. The buffering module 628 can be implemented using an array of First-In First-Out ("FIFO") buffers, such that each FIFO buffer is dedicated to a particular one of the memory clients 616, 618, and 620. The buffering module 628 also can be implemented using a unitary FIFO buffer, which has a buffering space that is shared by the memory clients 616, 618, and 620. Such a unitary FIFO buffer can be implemented as discussed, for example, in the co-pending and co-owned patent application of Tripathi et al., entitled "Apparatus, System, and Method for Delivering Data to Multiple Memory Clients via a Unitary Buffer," U.S. patent application Ser. No. 10/903,403, filed on Jul. 29, 2004, the disclosure of which is incorporated herein by reference in its entirety.

As illustrated in FIG. 6, the processing apparatus 612 also includes the memory request generator 624 and the memory request arbiter 626, which are connected between the memory controller 622 and the display engine 614. As discussed previously, the memory clients 616, 618, and 620 process data to generate respective components of a composite image. In the illustrated embodiment, the memory clients 616, 618, and 620 issue requests to access data stored in the memory 610, and, in response to these requests, the memory request generator 624 generates memory requests in the form of contracts for the memory clients 616, 618, and 620. Contracts include a set of instructions which are used by the memory controller to retrieve a range of data from memory, as was described above with reference to FIG. 4. Accordingly, the memory request generator 624 might generate a contract that includes multiple memory requests in response to receiving a particular one of the requests. Data specified by the memory requests in the contract can be at a level of granularity that is efficient in terms of accessing the memory 610. In an illustrative embodiment, each of the requests specifies data for a particular one of the memory clients 616, 618, and 620 at a frame level of granularity, while each of the contracts specifies a range of data for a particular one of the memory clients 616, 618, and 620 at a sub-frame level of granularity (e.g., a pixel, a portion of a scan line, an entire scan line, etc). In particular, each of the contracts specifies range of data to be processed by a particular one of the memory clients 616, 618, and 620 to generate respective components of the composite image. For example, the memory request generator 624 can generate a first contract specifying data to be processed by the display engine 614 to generate a first component of the composite image. Also, the memory request generator 624 can generate a second contract specifying data to be processed by the display engine 614 to generate a second component of the composite image. In addition, the memory request generator 624 can generate a third contract specifying data to be processed by the display engine 614 to generate a third component of the composite image.

In the illustrated embodiment, the memory request generator 624 identifies a presentation order of the components of the composite image and provides an indication of this presentation order to the memory request arbiter 626 through a contract. In some implementations, the components of the composite image includes a presentation order, and the memory request generator 624 identifies through a contract a presentation order of these components of the composite image based on, for example, screen locations of these components of the composite image. Using an arbiter to arbitrate between memory requests can be implemented as discussed, for example, in the co-pending and co-owned U.S. patent application Ser. No. 10/961,574, filed on Oct. 8, 2004, titled "Apparatus, System, and Method for Arbitrating Between Memory Requests," which application is hereby incorporated by reference in its entirety for all purposes.

As illustrated in FIG. 6, the memory request generator 624 is connected to the memory request arbiter 626, which receives the contracts that include memory requests generated by the memory request generator 624. The memory request arbiter 626 arbitrates between the contracts to determine the order in which the contracts should be issued to the memory controller 622. In the illustrated embodiment, the memory request arbiter 626 arbitrates between the contracts based on the presentation order of the components of the composite image. In particular, the memory request arbiter 626 issues the contract to the memory controller 622 based on the indication of this presentation order that is provided by the memory request generator 624. The memory request arbiter 626 can issue the first contract prior to the second contract based on whether the first component of the composite image is to be presented prior to the second component of the composite image. Similarly, the memory request arbiter 626 can issue the second contract prior to the third contract based on whether the second component of the composite image is to be presented prior to the third component of the composite image.

Advantageously, the illustrated embodiment allows contracts to be properly prioritized for servicing based on a presentation order of components of the composite image. As described above, at least one of the memory clients 616, 618, and 620 can correspond to an isochronous memory client. By servicing the memory requests based on the presentation order of the components of the composite image, the illustrated embodiment allows timely delivery of data to respective ones of the memory clients 616, 618, and 620 as the components of the composite image are generated, thus avoiding a stall and degradation of a display or an audio output. Accordingly, the illustrated embodiment serves to reduce instances in which a memory request becomes critical, since such a memory request can be prioritized for servicing ahead of other memory requests. In the event a memory request within a contract does become critical, the illustrated embodiment serves to reduce the service time for such a critical memory request, since such a critical memory request will typically be prioritized for servicing ahead of other memory requests. The service time is reduced by generating an amendment in the memory request generator 624 and sending that amendment to arbiter 626 and eventually to memory controller 622 for incorporation into previously sent contracts. Amendments include changes to previously sent contracts and will be incorporated if received in time as was discussed earlier with reference to FIG. 4.

Figure 7:
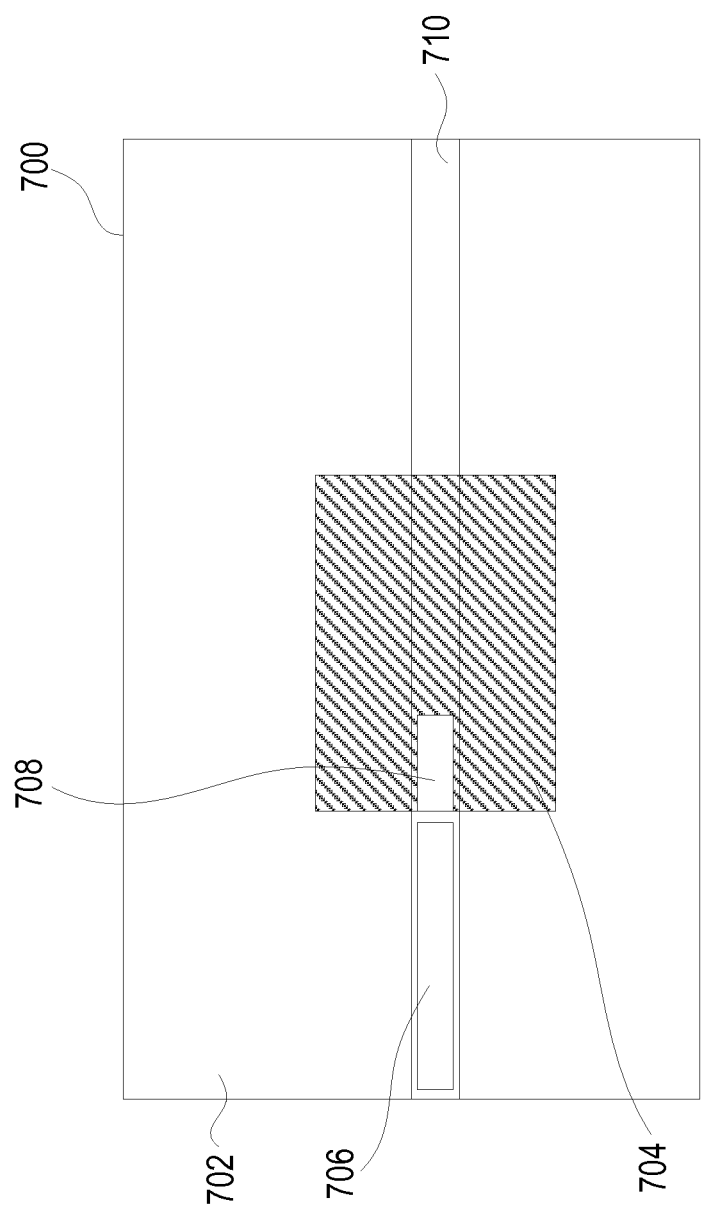
FIG. 7 illustrates an example of a video screen on which presentation elements are displayed in accordance with a scan-out order.

Although computer system 600 has been described in terms of displaying components of a composite image, computer system 600 can also be used generate contracts for presentation elements and to display those presentation elements. Presentation elements are a collection of pixels that are being displayed along a scan line and can be portions of an image that are being displayed at any given time. FIG. 7 illustrates an example of a video screen 700 on which images including a base 702, an overlay 704, a first presentation element 706, a second presentation element 708, and a scan line 710 are displayed on a display of the computer system 600 that uses contracts to coordinate requests from multiple memory client. In the illustrated example, the images to be displayed include a base 702 and an overlay 704 that is layered on top of the base 702. The base 702 can correspond to, for example, a background image, while the overlay 704 can correspond to, for example, a window containing a foreground image. When generating the display, a first memory client processes data to generate presentation elements representing the base 702, while a second memory client processes data to generate presentation elements representing the overlay 704. In one embodiment of the invention, a memory request generator creates a contract in response to receiving a request from the first memory client to retrieve data for base 702 and a request from the second memory client to retrieve data for an overlay 704. The contract generated by the memory request generator includes instructions for retrieving data corresponding to both the base 702 and the overlay 704. In one embodiment, a first contract is generated to retrieve ranges of data for the base and overlay of the first presentation element 706 and a second contract is generated to retrieve ranges of data for the base and overlay of the second presentation element 708. In general, data ranges specified by the first contract and data ranges specified by the second contract can be at the same level of granularity or at different levels of granularity.

In FIG. 7, presentation elements 506 and 508 representing portions of the base 702 and the overlay 704 are displayed along a scan line 710 that is directed, for example, from left to right; successive scan lines 710 are arranged from top to bottom. In the illustrated example, a memory request generator identifies a display order of the first presentation element 706 and the second presentation element 708 based on screen locations of the first presentation element 706 and the second presentation element 708 with respect to the scan line 710. In particular, the display order of the first presentation element 706 and the second presentation element 708 corresponds to a scan-out order of the first presentation element 706 and the second presentation element 708. In the illustrated example, the memory request generator assigns a higher priority to the first contract than to the second contract, since the first presentation element 706 is to be displayed prior to the second presentation element 708 along the scan line 710. In the event that two or more contracts specify data for presentation elements that have the same or overlapping screen locations (e.g., layered on top of one another), the memory request generator can assign equal priorities to these contracts. Alternatively, the memory request generator can assign priorities to these contracts based on a particular rule. One example of such a rule is to assign a higher priority to a presentation element located at a higher layer or to assign a higher priority to a presentation element located at a lower layer. Another example of such a rule is to assign priorities to these contracts based on buffering space available for various memory clients in a buffering module. For example, a higher priority can be assigned to a contract for a particular memory client if a buffering space for that memory client is becoming vacant. A further example of such a rule is to assign priorities to these contracts to provide efficiencies in terms of accessing a memory. For example, to allow for a larger memory access burst size for a particular memory client, a higher priority can be assigned to a contract for that memory client, even if the contract specifies data range for a presentation element to be displayed later in time. In one embodiment, the priorities can be made part of the contract, itself. It will be appreciated that priorities can be assigned to these contracts based on a combination of the rules discussed above.

In displaying the presentation elements of FIG. 7, a memory request arbiter issues the first contract prior to the second contract based on the higher priority assigned to the first contract. Accordingly, data for the first presentation element 706 is timely delivered to the display engine for processing, thus avoiding a stall and degradation of the display output. In the event two or more contracts are assigned equal priorities, the memory request arbiter can issue these contracts based on their arrival order or some other order.

Figure 8:
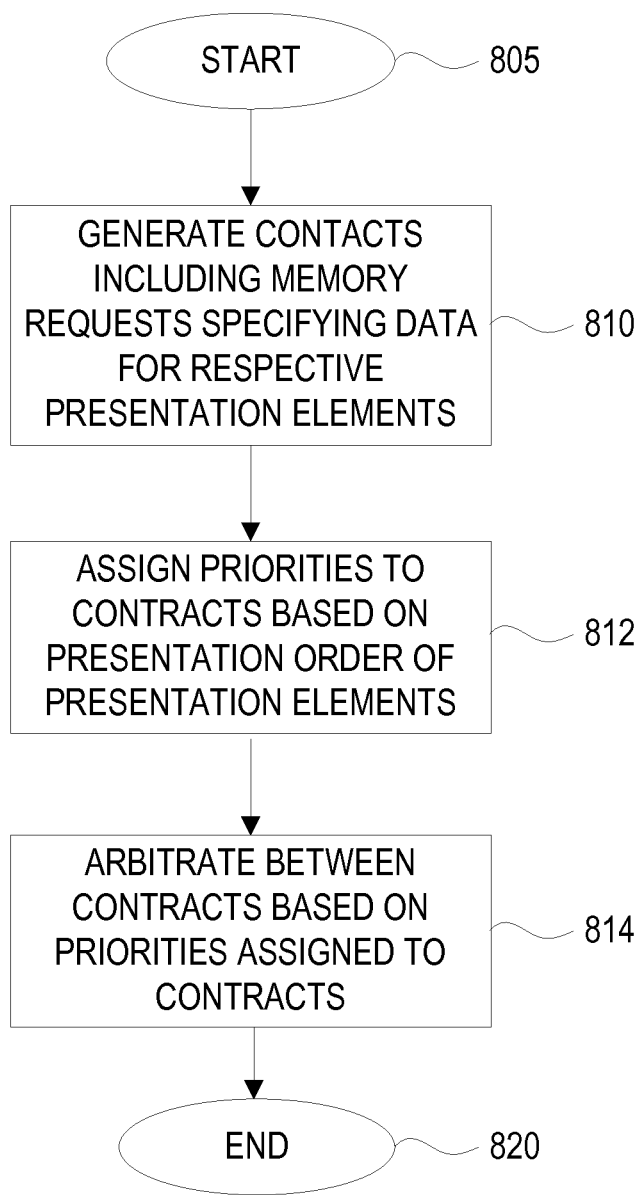
FIG. 8 illustrates a flow chart for servicing contracts in accordance with an embodiment of the invention.

FIG. 8 is a flow chart illustrating data retrieval in computer 602 using contracts, in accordance with an embodiment of the invention. The process starts in step 805 where a decision has been made in the display engine 614 to retrieve data from a memory 610. Next in step 810, contracts including memory requests specifying data for respective presentation elements are generated in the memory request generator 624 after receiving instructions from the display engine 614 to retrieve data from memory. The instructions to retrieve data are generated by the memory clients 616, 618, and 620 located in the display engine 614. In the illustrated embodiment, the presentation elements correspond to presentation elements that can be layered or otherwise combined to form a display output. Examples of presentation elements include display surfaces representing a base, a cursor, and an overlay. As discussed previously, data specified by the requests is typically at a coarser level of granularity than data specified by the memory requests. Accordingly, the memory request generator 624 can generate a contract having multiple data requests in response to receiving a particular one of the requests.

Next in step 812, the memory request generator 624 assigns priorities to the contracts based on a presentation order of the presentation elements. In the illustrated embodiment, the memory request generator 626 identifies a display order of the presentation elements and assigns priorities to the contracts based on this display order. In particular, the memory request generator 624 assigns a higher priority to a contract that specifies a range of data for a presentation element to be displayed earlier in time. On the other hand, the memory request generator 624 assigns a lower priority to a contract that specifies a range of data for a presentation element to be displayed later in time. In the illustrated embodiment, the memory request generator 624 provides an indication of the assigned priorities in the form of one or more tags that are incorporated in the contracts. Alternatively, the memory request generator 624 can provide the indication of the assigned priorities separately from the contracts.

Next in step 814, the memory request arbiter 626 arbitrates between the contracts based on the priorities assigned to the contracts. In the illustrated embodiment, a memory request arbiter 626 issues the contracts to a memory controller 622 based on the indication of the assigned priorities provided by the memory request generator 624. In particular, the memory request arbiter 626 issues a contract earlier in time if that contract is assigned a higher priority. On the other hand, the memory request arbiter 624 issues a contract later in time if that contract is assigned a lower priority. Finally, in step 820 the process ends when the contract is sent to the memory controller for processing.

Additionally, amendments can be used to correct or change contracts after they are sent, e.g. by making changes to parameters in the contract. If a contract having a fixed set of instructions is sent but circumstances change such that the set of instructions should be modified, then an amendment can be sent to modify the contract. Amendments can be used to change parameters such as the location of the buffer from which data is to be fetched. An example of when an amendment can be used is if scanning is done slower than the rendering rate and a user selects a specific portion of the screen for display. If data was originally being fetched from a first buffer according to the first contract but displaying the selected portion of the screen required fetching data from a second buffer, then an amendment could be used to instruct that data be fetched from the second buffer instead of the first buffer.

In some embodiments, the contract has a cutoff point after which amendments to that contract can no longer be sent. In other embodiments amendments can be sent at anytime, and the system dynamically makes adjustments to the contract according to the amendment. However, if the amendment is sent but the next contract is ready, then the amendment is suppressed, and/or the amendment can be made part of the next contract instead. In one embodiment the amendment can be suppressed by the memory controller whereas in another embodiment the amendment can be suppressed by the client.

In another embodiment, a warning signal, similar to that sent for contracts, indicating that an amendment will be sent is transmitted prior to sending an amendment. An advantage of sending a warning signal indicating that an amendment is imminent is that the system can adjust for this amendment. In one embodiment the warning is done by setting a bit. Warning signals can be used in VGA mode, which can include a split screen mode, as described above with reference to FIG. 4.

FIG. 9 is a flow chart illustrating data retrieval in computer 602 using amendments and contracts, in accordance with an embodiment of the invention. The process starts in step 905 where a decision has been made in the display engine 614 to retrieve data from a memory 610. Next in step 910, memory request generator 624 generates contracts including memory requests specifying data for respective presentation elements, similarly to step 810 of FIG. 8. Next in step 912, memory request generator 624 assigns priorities to the contracts based on a presentation order of the presentation elements in the same way as discussed in step 812 of FIG. 8.

After the priorities are assigned in step 912, the memory request generator 624 makes a decision in step 914 whether there is an amendment to the contract. If the decision in step 914 is that an amendment has been sent then the memory request generator 624 makes another decision in step 916 whether there is sufficient time available to amend the contract. If there is sufficient time to amend the contract then the contract is amended in step 918 and the process proceeds to step 920. The contract can be amended in the memory request generator 624. Details of the amendment and whether there is sufficient time to amend the contract are discussed in detail above with reference to FIG. 4. If the decision in step 916 is that there is not sufficient time available to amend the contract the process proceeds to step 920. As was discussed in more detail with reference to FIG. 4, one reason why the contract cannot be amended is because the amendment was sent too late and data has already been retrieved. Next in step 920 another decision is made whether a different contract should be amended with the previous amendment. If the decision is that a different contract should not be amended then the process continues to step 924. However, if the decision in step 920 is to amend a different contract, then a different contract is identified and the identified different contract is amended in step 922 and the process continues to step 924. There are many situations where a different contract can be amended such as receiving an amendment with a generic change than can be implemented by any contract. An amendment with a generic change might include a request to retrieve a set of data which can be carried out by any contract, or a request to adjust the rate of data transmission.

Next in step 924, the memory request arbiter 626 arbitrates between the contracts based on the priorities assigned to the contracts and the amendments which may have been incorporated in steps 918 and 922. In the illustrated embodiment, a memory request arbiter 626 issues the contracts to a memory controller 622 based on the indication of the assigned priorities provided by the memory request generator 624 in the form of a contract or amendment. In particular, the memory request arbiter 626 issues a contract earlier in time if that contract is assigned a higher priority or amended to have a higher priority. On the other hand, the memory request arbiter 624 issues a contract later in time if that contract is assigned a lower priority or amended to have a lower priority.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A method of retrieving data stored in a memory, the method comprising:
   generating, by a display engine of a graphics processor, a contract, wherein the contract specifies:
      a set of parameters defining a surface to be fetched from the memory; and
      a pixel rate for the display engine;
   transferring the contract from the display engine to a memory controller;
   performing, by the memory controller, a plurality of memory access operations to fetch data for the surface from the memory in a fetch order determined by the memory controller based on the set of parameters specified by the contract;
   sending, by the memory controller, the fetched data in the fetch order to the display engine based on the pixel rate specified by the contract; and
   processing, by the display engine, the fetched data to generate pixels of an image for display.

2. The method of claim 1 wherein, for each of a plurality of scanout sweeps, a new contract is transferred once per scanout sweep.

3. The method of claim 2 wherein, for each scanout sweep the new contract is transferred at a same time relative to the end of the scanout sweep.

4. The method of claim 1 wherein the set of parameters defines the surface to be fetched as a portion of an in-memory surface.

5. The method of claim 4 wherein the set of parameters defining the surface to be fetched includes:
   a base address for the in-memory surface;
   a starting offset for the portion of the in-memory surface that is to be fetched;
   a width and height of the portion of the in-memory surface that is to be fetched;
   a relative scan-out positioning indicative of a placement of the portion of the in-memory surface that is to be fetched within a display area; and
   a scaling parameter.

6. The method of claim 5 wherein sending the fetched data includes sending the fetched data based on the pixel rate specified by the contract and the scaling parameter.

7. The method of claim 1 wherein the fetched data is sent to the display engine in an isochronous stream.

8. The method of claim 1 further comprising buffering the fetched data in the display engine.

9. The method of claim 1 further comprising:
   generating, by a second display engine of the graphics processor a second contract, wherein the second contract specifies at least:
      a set of parameters defining a second surface to be fetched from memory; and
      a pixel rate for the second display engine;
   transferring the contract from the second display engine to the memory controller;
   performing, by the memory controller, a plurality of memory access operations to fetch second data from the memory in an order determined by the memory controller based on the parameters defining the second surface;
   sending, by the memory controller, the fetched second data to the second display engine based on the pixel rate specified by the second contract; and
   processing, by the second display engine, the fetched second data to generate pixels of an image for display.

10. The method of claim 9 wherein the second contract is transferred after the first contract is transferred and after one sweep is performed.

11. The method of claim 1 further comprising:
    generating, by the display engine, a contract amendment in response to a change in the display engine;
    transferring the contract amendment from the display engine to the memory controller;
    determining, by the memory controller, whether the contract amendment is processible; and
    fetching data from the memory controller according to the contract incorporating the contract amendment in the event that the contract amendment is processible.

12. The method of claim 11 wherein the determination is based on whether the memory controller has sufficient time to incorporate the contract amendment.

13. A method of displaying an image, the method comprising:
    generating, by a display engine of a graphics processor, a first contract, wherein the first contract specifies at least:
       a first set of parameters defining a first surface to be fetched from the memory; and
       a pixel rate for the display engine;
    transferring the first contract from the display engine to a memory controller;

performing, by the memory controller, a plurality of memory access operations to fetch the data for the first surface from the memory in a first order determined by the memory controller based on the first set of parameters;

sending, by the memory controller, the fetched data in the first fetch order for the first surface to the display engine based on the pixel rate specified by the contract;

generating, by the display engine, a second contract, wherein the second contract specifies at least a second set of parameters defining a second surface to be fetched from the memory;

transferring the second contract from the display engine to the memory controller;

performing, by the memory controller, a plurality of memory access operations to fetch the data for the second surface from the memory in a second order determined by the second set of parameters;

sending, by the memory controller, the fetched data in the second fetch order for the second surface to the display engine based on the pixel rate specified by the first contract;

processing, by the display engine, the fetched data for the first surface and the second surface to generate pixels of an image for display.

14. The method of claim 13 further comprising:

generating a contract amendment in response to a changes in the display engine;

transferring the contract amendment to the memory controller;

determining, by the memory controller, whether the contract amendment can be processed along with the first contract; and fetching data from the memory controller according to the first contract incorporating the contract amendment if it is determined that the contract amendment can be processed along with the first contract.

15. The method of claim 14 wherein the decision is based on whether the memory controller has sufficient time to incorporate the contract amendment into the first contract.

16. The method of claim 13 wherein the first contract is generated by a first memory client within the display engine and the second contract is generated by a second memory client within the display engine.

17. The method of claim 13 wherein processing the fetched data for the first surface and the second surface includes overlaying a pixel based on the fetched data for the second surface over a pixel based on the fetched data for the first surface.

18. A system for retrieving data stored in a memory, the system comprising:

a display engine configured to generate a contract, wherein the contract specifies at least:

a set of parameters defining a surface to be fetched from the memory; and a pixel rate for the display engine; and a memory controller coupled to the display engine, wherein the memory controller is configured to receive the contract from the display engine and to perform a plurality of memory access operations to fetch data for the surface from the memory in an order determined by the memory controller based on the set of parameters defining the surface;

wherein the memory controller is further configured to send the fetched data in the fetch order to the display engine based on the pixel rate specified by the contract; and wherein the display engine is configured to process the fetched data to generate pixels of an image for display.

19. The system of claim 18 wherein the display engine is further configured to generate an amendment to the contract.

20. The system of claim 18 wherein the display engine is further configured to send a new contract to the memory controller once per scanout sweep.

* * * * *